Feb. 18, 1930.  W. S. REARICK  1,747,264
METALLIC FOIL CUTTER
Filed Sept. 2, 1927   2 Sheets-Sheet 1

WITNESSES  
INVENTOR:

Feb. 18, 1930.                W. S. REARICK                1,747,264
                            METALLIC FOIL CUTTER
                           Filed Sept. 2, 1927        2 Sheets-Sheet 2

Patented Feb. 18, 1930

1,747,264

UNITED STATES PATENT OFFICE

WALTER S. REARICK, OF TARENTUM, PENNSYLVANIA, ASSIGNOR TO ALUMINUM COMPANY OF AMERICA, OF PITTSBURGH, PENNSYLVANIA, A CORPORATION OF PENNSYLVANIA

METALLIC-FOIL CUTTER

Application filed September 2, 1927. Serial No. 217,067.

This invention relates to rotary cutters to be used on packs of thin metallic sheets or foil.

Generally stated the object of the invention is to provide simple and effective means for rapidly cutting packs of considerable thickness, of thin metallic sheets or foil, without tearing the foil, without causing the edges of adjacent sheets to stick together, and with a minimum of waste due to spoiled material.

Rotary cutters have been used for trimming fabric, and cutting multiple layers of cloth, paper, and the like. However, it has been found that such cutters as have been heretofore used on other materials do not work satisfactorily when applied to packs of thin metal sheets, such, specifically, as aluminum foil packs.

In the making of foil, sheets of metal of a thickness of 0.005", or thinner, are continuously rolled. The strips of foil are assembled in packs of fifty to over one hundred sheets, these being frequently interleaved with tissue paper. These packs must be cut to smaller packs of desired dimensions and shapes. This cutting of packs of foil has heretofore been a difficult operation to perform satisfactorily, and at low cost. Where such packs are small, they may be satisfactorily cut by a guillotine shear. But where the packs are relatively long, and it is desired to trim or split them lengthwise, the guillotine type of shear cannot be used. It has been the practice therefore to trim or cut such long packs by rolling them on a wooden drum and then cutting through on the desired axial plane by hand with a chisel. After this cutting it is necessary to trim the edges that have been cut by the chisel, by another operation, usually in a guillotine shear. Such a method of cutting and trimming is slow, expensive, and wasteful of material.

For a considerable time past there has been constant effort to devise a means for effecting and rapidly trimming, slitting, or cross cutting packs of superposed thin foil. Ordinary rotary slitters from the cloth art have been tried, but they do not function properly. Among other defects they tend to cause the adjacent cut metallic edges to adhere or to have their edges entangled, and thus to make separation of the cut sheets difficult.

The present invention comprises the provision of a rotary cutter of a novel form, and its operation in a different manner from that of the prior art rotary cutters.

Figure 1:
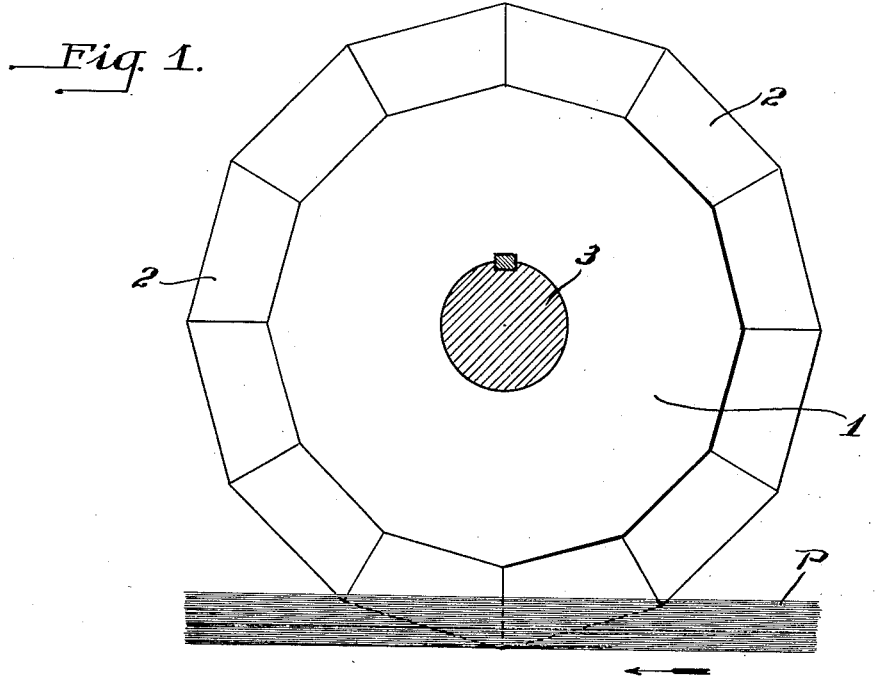
Figure 2:
Figure 3:
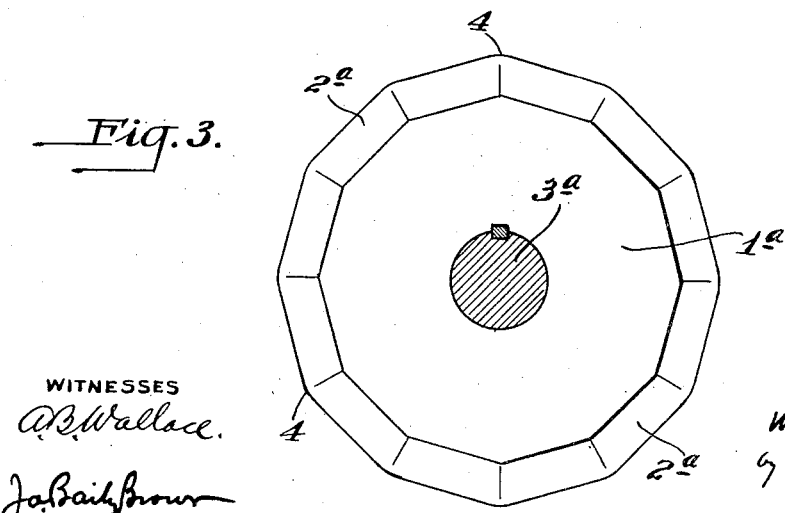
Figure 4:
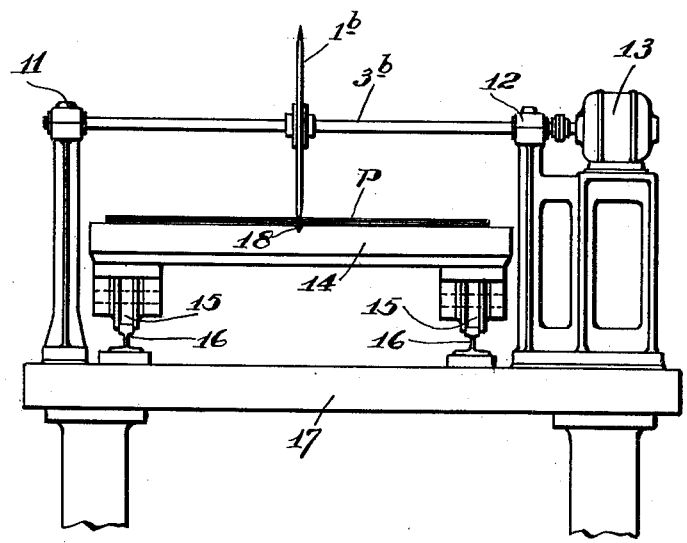

Referring to the drawings, Fig. 1 shows a side elevation of the cutter; Fig. 2 is a plan or edge view thereof; Fig. 3 is a view similar to that of Fig. 1, showing a modified form of cutter; Fig. 4 is an end elevational view of a machine using a cutter in fixed position, the foil pack being moved under it; and Fig. 5 shows a cutter on the shaft of a portable motor.

The cutter blade 1 is made from a disc of suitable tool steel. The periphery is divided into a plurality of equal straight edges 2, forming a regular polygon in shape. The number of the straight edges 2 is not critical but some material number such as twelve, as illustrated, is preferred, so that the edges will be comparatively short with respect to the periphery of the blade as a whole. Each straight edge is sharpened by beveling, preferably equally on each side, as illustrated in Fig. 2. The blade is mounted upon a suitable shaft 3, which may be rotated in any desired manner, as for example by means of an individual motor, etc. Various suitable driving means are of course well known and constitute no part per se of this invention.

Figure 5:
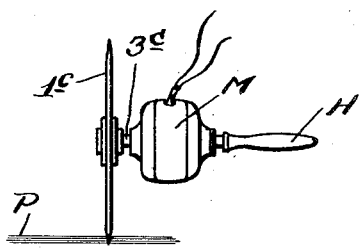

The shaft on which the cutter blade is mounted may have a fixed axis, the pack P of foil sheets being moved past the blade, as shown in Figs. 1 and 4; or the pack may be held stationary, and the shaft of the blade may be moved relative to the pack, so as to cause the cutter to traverse the pack as shown in Fig. 5. For example, in the latter case, the cutter $1^c$ may be mounted upon the shaft $3^c$ of a portable motor M, with a handle H, as shown in Fig. 5. This can be moved by hand to any desired position, and by hand moved across the pack of sheets to be cut.

As illustrated in Fig. 1 the pack of sheets P is moving relative to the cutter 1, driven by shaft 3. The cutter is being rotated counter-clockwise. In this operation the straight cutting edges of the blade move forward and upwardly with respect to the pack of foil being cut. There is no downward pressure of the blade at any point upon the pack. The cutter is rotated at high speed, as for example 1800 R. P. M., and the pack is moved at say four feet per second past the cutter. Consequently, the cutting edges travel into the advancing pack and move upward with respect thereto so that they have a true slitting and cutting action on the sheets, without compression of the pack. This tends to separate the edges of the foil, rather than to compress and stick them together.

The preceding paragraph contains a description of the preferred operation of this cutter, and illustrates a relative positioning and movement of the cutter and pack which has been found to be entirely satisfactory. Modifications may be used in that the pack may be supported at a higher level with respect to the cutting edge so that the edges of the cutter extend well below the pack bottom, as shown in Fig. 4. The pack may be stationary, and the cutter moved transversely thereof on a fixed track, or by hand as in Fig. 5, and for certain foil the cutter may be rotated in clockwise direction with the arrangement of Fig. 1, with satisfactory results.

In Fig. 3 a modification of the cutter is shown in that the corners between the meeting cutting edges are rounded off. The operation of this modification is substantially the same in all respects as that above described.

One arrangement for using the cutter in fixed axial position is illustrated in Fig. 4, in which the cutter blade 1$^b$ is mounted on a driving shaft 3$^b$, journalled in pedestal bearings 11 and 12, and coupled to the shaft of a suitable motor 13. Disposed thereunder is a movable carriage 14, provided with rollers 15, adapted to cooperate with tracks 16 supported on a table 17. A notch 18, aligned with the cutter blade is preferably provided in the table, so that the blade may pass entirely through the pack P without contact of the cutting edge with the supporting table.

The effectiveness of this form of cutter seems to result from the use of a rapidly rotated, straight edged blade, so moved with respect to the foil pack as to result in a true slitting action, as opposed to a pressure action of the blade. Tests have demonstrated the superior effectiveness of this device as compared with other forms of apparatus heretofore used for like purposes.

I claim:

1. A cutter for metallic foil packs, comprising a rotary disc the periphery of which consists of a continuous series of straight cutting edges arranged in the form of a regular polygon, and means for rapidly rotating the disc.

2. Apparatus for cutting packs of metal foil comprising a rotary disc having its periphery formed into a series of straight sharp cutting edges, means to rotate the disc at high speed, a table adapted to support a pack of foil in position to be cut through by the knife, and a mounting for the table adapting it to be moved past the knife in cooperative relation thereto permitting the knife to pass through the pack of foil.

In testimony whereof, I sign my name.

WALTER S. REARICK.